United States Patent [19]

Ikeno et al.

[11] Patent Number: 4,818,805
[45] Date of Patent: Apr. 4, 1989

[54] VULCANIZABLE FLUORINATED SILICONE COMPOSITIONS

[75] Inventors: Masayuki Ikeno; Masanobu Miyakoshi; Hiroshi Inomata, all of Annaka, Japan

[73] Assignee: Shin-Etsu Chemical Co., Ltd., Tokyo, Japan

[21] Appl. No.: 157,939

[22] Filed: Feb. 19, 1988

[30] Foreign Application Priority Data

Feb. 20, 1987 [JP] Japan .................................. 62-037653

[51] Int. Cl.$^4$ .............................................. C08G 77/06
[52] U.S. Cl. ........................................ 528/15; 528/31; 528/32; 528/42; 525/478
[58] Field of Search .................... 528/15, 42, 31, 32; 525/478

[56] References Cited

U.S. PATENT DOCUMENTS 4,348,531  9/1982  Evans .................................... 528/42
4,719,275  1/1988  Benditt et al. ........................ 528/15
4,742,101  5/1988  Yoshida ................................ 528/42

Primary Examiner—Melvyn I. Marquis
Attorney, Agent, or Firm—Birch, Stewart, Kolasch & Birch

[57] ABSTRACT

Curable or vulcanizable fluorinated silicone compositions which comprise a uniform mixture of predetermined amounts of an organopolysiloxane of the following average unit formula

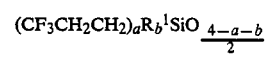

$$(CF_3CH_2CH_2)_a R_b^1 SiO_{\frac{4-a-b}{2}}$$

in which $R^1$ represents a monovalent hydrocarbon group having from 1 to 8 carbon atoms, and a and b are, respectively, a defined value; an organohydrogenpolysiloxane having at least three SiH groups in one molecule and consisting of the several siloxane units; and a catalytic amount of a platinum compound. If necessary, another type of polysiloxane may be added to the above composition in order to further improve physical properties. The composition is rapidly vulcanized to give a cured product having stable physical properties within a short time.

8 Claims, No Drawings

VULCANIZABLE FLUORINATED SILICONE COMPOSITIONS

BACKGROUND OF THE INVENTION

1. Field of the Invention

This invention relates to silicone compositions and more particularly, to vulcanizable or curable fluorinated silicone compositions which hare a high vulcanizing speed and whose hardness and physical properties are stabilized within a short time.

2. Description of the Prior Art

As is known in the art, fluorinated silicone elastomer compositions have good resistances to gasoline and oil and are thus useful as rubber parts of aircrafts. A variety of vulcanizable fluorinated silicon elastomer compositions of the addition reaction type used for these purposes have been proposed, for example, in Japanese Patent Publication Nos. 60-27691, 59-31542 and 53-35903 and Japanese Laid-open Patent Application Nos. 56-829, 57-182353 and 59-80464.

In general, fluorinated silicone elastomer compositions of the addition reaction type are formulated with crosslinking agents containing SiH groups. The use of a

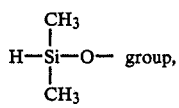 group, which has good vulcanizing characteristics, as a main functional group of such a crosslinking agent has been proposed. Moreover, the introduction of a tetrafunctional

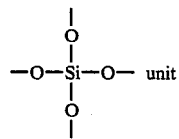 unit or a trifunctional

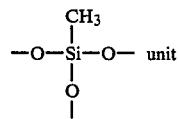 unit has also been proposed so as to provide three ore more SiH groups in one molecule of the crosslinking agent.

However, these known fluorinated silicone elastomer compositions are disadvantageous in that they undesirably take a relatively long vulcanization time of from commencement of the vulcanization till its completion and that a degree of hardness cannot be attained within a short time. For instance, although the fluorinated silicone elastomer compositions are frequently employed as coating and potting materials of various types of hydrid IC or sensors mounted, for example, in automobiles because of its good resistance to gasoline, heating at 150° C. should be continued over several hours until a certain hardness (penetration) is obtained, a long vulcanizing time being thus required.

SUMMARY OF THE INVENTION

It is accordingly an object of the invention to provide a curable or vulcanizable fluorinated silicone composition of the addition reaction type which has a high curing rate and can be cured within a short time.

It is another object of the invention to provide a vulcanizable fluorinated silicone composition which is readily converted into a gel or rubber having stable hardness and physical properties.

It is a further object of the invention to provide a vulcanizable fluorinated silicone composition which comprises a SiH group-bearing crosslinking agent into which a siloxane structure having better functionality is introduced, thereby improving hardening properties.

Broadly, the present invention is characterized by a composition which comprises an organohydrogen polysiloxane crosslinking agent modified with siloxane units of the following formula

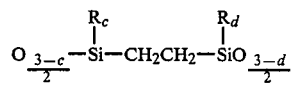

in which each R represents a monovalent hydrocarbon group having from 1 to 8 carbon atoms, $c=0$ to 3, $d=3$ to 0, and $c+d=0$ to 3, by whiich the functionality can be increased to give a hexafunctional polysiloxane in a maximum.

More particularly, the invention provides a curable or vulcanizable fluorinated silocone composition which comprises a uniform mixture of:

(1) 100 parts by weight of an organopolysiloxane of the following average unit formula $$(CF_3CH_2CH_2)_a R^1_b SiO_{\frac{4-a-b}{2}}$$

in which $R^1$ represents a monovalent hydrocarbon group having from 1 to 8 carbon atoms provided that at least 0.05 mole% of a vinyl group and/or an allyl group is contained in the polysiloxane, $a=0.1$ to 1.0, $b=2.5$ to 1.0, and $a+b=1.8$ to 3.0;

(2) from 0.1 to 30 parts by weight of an organohydrogenpolysiloxane having at least three SiH groups in one molecule and consisting of the following siloxane units

| | |
|---|---|
| 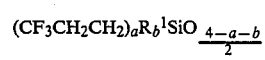 | 0.01–33 mole % |
| $H-\underset{\underset{CH_3}{\vert}}{\overset{\overset{CH_3}{\vert}}{Si}}-O_{0.5}$ | 0.02–85 mole % |
| $(R^5-CH_2CH_2)\underset{\underset{}{\vert}}{\overset{\overset{CH_3}{\vert}}{Si}}O$ | 0–96 mole % |
| $R_2^4SiO$ | 0–90 mole % | in which Q represents a divalent organic group having a molecular weight not larger than 200, $R^2$, $R^3$ and $R^4$ independently represent a monohydrocarbon group having from 1 to 8 carbon atoms, $R^5$ represents a perfluoroalkyl group having from 1 to 8 carbon atoms, c=0 to 3, d=3 to 0 and c+d=0 to 3;

(3) from 0 to 30 parts by weight of an organopolysiloxane of the following average formula a vinyl group and an allyl group, and the like. The vinyl and/or allyl group is mainly contained as terminal groups of the polysiloxane. Specific examples of the organopolysiloxane include those polysiloxanes of the following formulae (1a) to (1d)

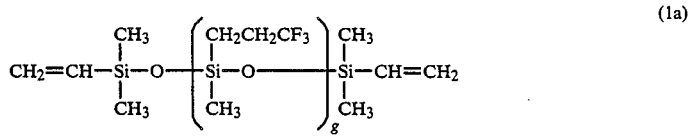

(1a)

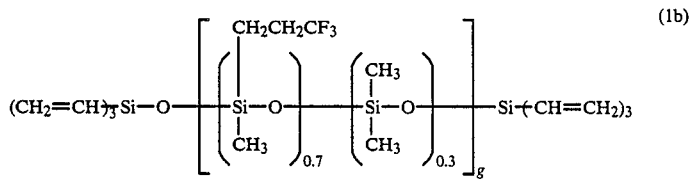

(1b)

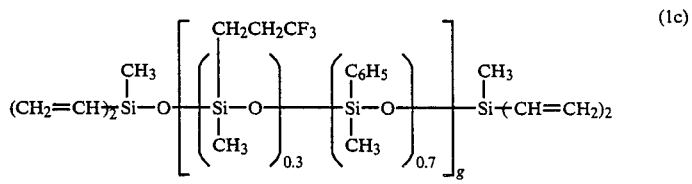

(1c)

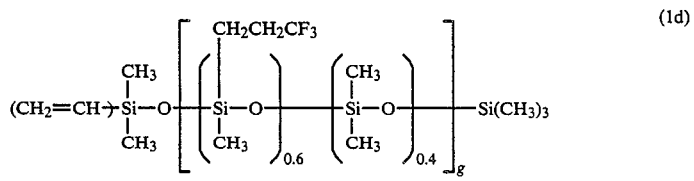

(1d)

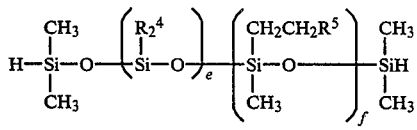

in which $R^4$ and $R^5$ have, respectively, the same meanings as defined above, e=0 to 100, f=100 to 0, and e+f=0 to 100; and (4) a catalytic amount of a platinum compound.

The ingredient (3) may be formulated in order to improve physical properties and particularly, an elongation, if necessary.

DETAILED DESCRIPTION OF THE INVENTION

The organopolysiloxane used as the ingredient (1) according to the invention has the following average unit formula (1)

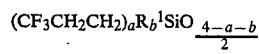

in which $R^1$ represents a monovalent hydrocarbon group having from 1 to 8 carbon atoms provided that at least 0.05 mole%, preferably 0.1 to 2 mole% of a vinyl group and/or an allyl group is contained in the polysiloxane, a=0.1 to 1.0, b=2.5 to 1.0, and a+b=1.8 to 3.0. Examples of the monovalent hydrocarbon group represented by $R^1$ include an alkyl group having 1 to 8 carbon atoms such as a methyl group, an ethyl group and a propyl group, an aryl group having 6 to 8 carbon atoms such as a phenyl group, an alkenyl group such as in which g is a positive integer. These polymers may be used singly or in combination.

The organopolysiloxane is prepared, for example, by an ordinary process in which an oligomer of the formula

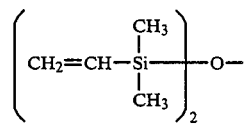

used as an end group and an oligomer having units of the formula

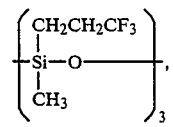

and optionally an oligomer having units of the formula

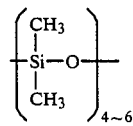

are heated in the presence of an alkali catalyst such as KOH, CsOH or the like or an acid catalyst such as $CF_3SO_3H$ at a temperature of from room temperature to 180° C. to cause an equilibrium reaction to proceed, and then neutralizing the system or the catalyst.

The degree of polymerization of the organopolysiloxane of the formula (1) is not necessarily critical. However, too low a degree will results in poor elastomer strength, whereas too high a degree is disadvantageous in that handling as a liquid polymer becomes difficult. Accordingly, it is preferred that the organopolysiloxane of the formula (1) is in the form of liquid and has a viscosity at 25° C. of from 100 to 200,000 centistokes. Moreover, in order to impart a suitable resistance to hydrocarbon solvents, it is preferred that the concentration of the $$\begin{array}{c} CH_2CH_2CF_3 \\ | \\ -(Si-O)- \\ | \\ CH_3 \end{array} \text{ units}$$

in the molecule is not less than 30 mole%, preferably 40 to 90 mole%.

The organohydrogenpolysiloxane of the ingredient (2) used in the present invention is a polysiloxane having at least three SiH groups in the molecule and consisting of the following siloxane units:

| | |
|---|---|
| $\begin{array}{cc} R_c^2 & R_d^3 \\ | & | \\ O_{\frac{3-c}{2}} -Si-Q-Si-O_{\frac{3-d}{2}} \\ \end{array}$ | 0.01-33 mole % |
| $\begin{array}{c} CH_3 \\ | \\ H-Si-O_{0.5} \\ | \\ CH_3 \end{array}$ | 0.02-85 mole % |
| $\begin{array}{c} CH_3 \\ | \\ (R^5-CH_2CH_2-)SiO \end{array}$ | 0-96 mole % |
| $R_2^4SiO$ | 0-90 mole % | in which Q represents a divalent organic group having a molecular weight not larger than 200, preferably 10 to 100, $R^2$, $R^3$ and $R^4$ independently represent a monohydrocarbon group having from 1 to 8 carbon atoms, $R^5$ represents a perfluoroalkkyl group having from 1 to 8 carbon atoms, c=0 to 3, d=3 to 0 and c+d=0 to 3.

More specifically, the divalent organic groups represented by Q include

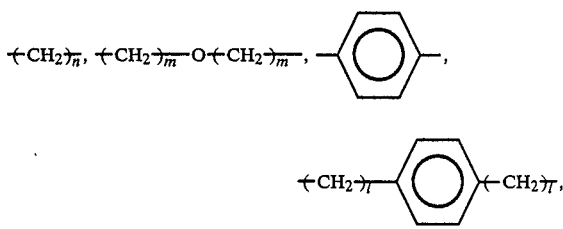

etc. wherein each of n, m and l is a positive integer. The preferable divalent organic groups include $-CH_2-CH_2-$, $-CH_2-CH_2-CH_2-O-CH_2-CH_2-CH_2-$, and

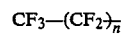

The monohydrocarbon groups represented by $R^2$, $R^3$ and $R^4$ include an alkyl group having 1 to 8 carbon atoms, and an aryl group having 6 to 8 carbon atoms such as methyl group, ethyl group, phenyl group and the like. The perfluoroalkyl groups represented by $R^5$ include $$CF_3-(CF_2)_{\overline{n}}$$

wherein n is 0 to 8.

Examples of the organohydrogenpolysiloxane include those polysiloxanes of the following formulae (2a) to (2e):

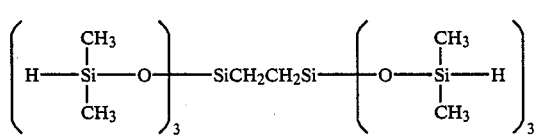

(2a)

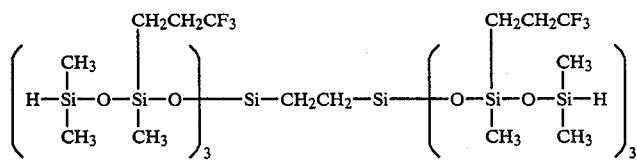

(2b)

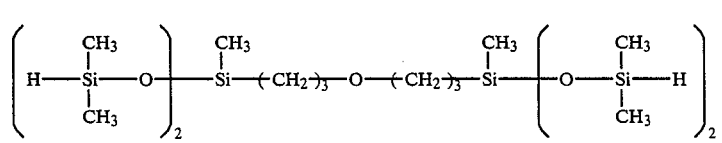

(2c)

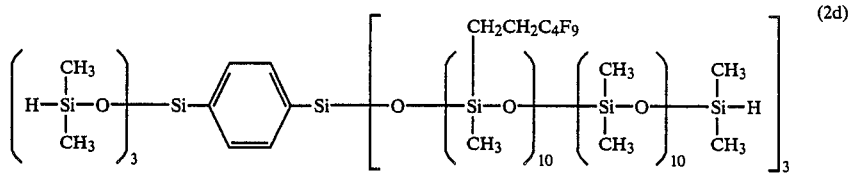

(2d)

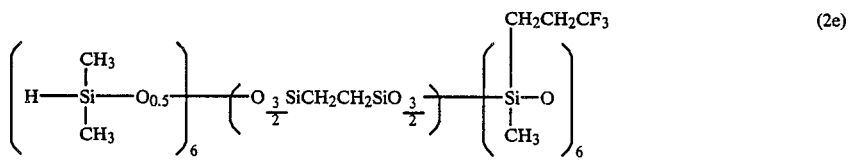

(2e)

These polysiloxanes may be used singly or in combination.

The organohydrogenpolysiloxanes of, for example, (2a) is prepared by subjecting $X_3SiH$ and $CH_2{=}CHSiX_3$, in which X represents a halogen atom such as Cl or a hydrolyzable group such as —$OCH_3$ to hydrosilation addition reaction, and is subsequently co-hydrolyzed with

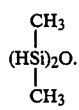

With (2c)

and $(CH_2{=}CHCH_2)_2O$ are reacted similar to the case of (2a), followed by co-hydrolysis with

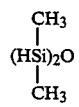

to obtain (2c). Moreover, when

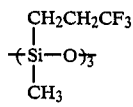

is subjected to equilibrium reaction with the organohydrogenpolysiloxane of (2a) in the presence of $CF_3SO_3H$ catalyst at a temperature of from room temperature to 50° C. for several hours, organohydrogenpolysiloxane (2b) is obtained.

In practice, the organohydrogenpolysiloxane used as the ingredient (2) should preferably be selected to have such a structure as to be miscible with the organopolysiloxane used as the ingredient (1). In this sense, it is preferable that the content of the fluorine atoms in the ingredient (2) increases with an increasing content of fluorine atoms in the ingredient (1).

It is preferred that the organohydrogenpolysiloxane used as the ingredient (2) has a viscosity at 25° C. of from 10 to 300 centistokes.

If the amount of the ingredient (2) is too small, the crosslinkage becomes insufficient, making the vulcanization difficult. On the contrary, when the amount is too great, troubles such as foaming at the time of vulcanization may take place. Accordingly, the amount of the organohydrogenpolysiloxane of the ingredient (2) is in the range of from 0.1 to 30 parts by weight, preferably from 0.5 to 10 parts by weight, per 100 parts by weight of the organopolysiloxane of the ingredient (1).

In the practice of the invention, a polysiloxane of the following average formula may be added as the ingredient (3), if necessary

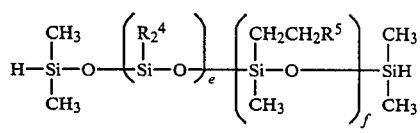

in which $R^4$ and $R^5$ have, respectively, the same meanings as defined before, e=0 to 100, f=100 to 0 and e+f=0 to 100.

This organopolysiloxane used as the ingredient (3) is used along with the organohydrogenpolysiloxane as the ingredient (2) to improve physical properties and particularly, an elongation of the composition of the invention, and is an ingredient effective in imparting a great elongation although it is low in viscosity. Specific examples of the organopolysiloxane are those compounds of the following formulae (3) to (3c):

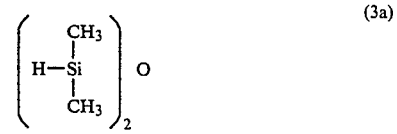

(3a)

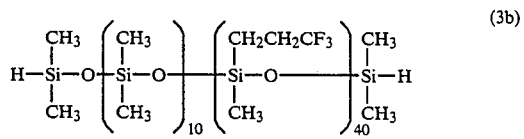

(3b)

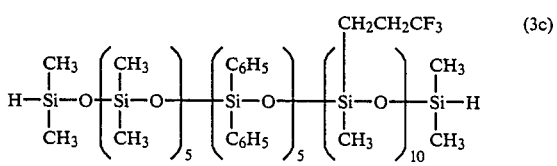

(3c)

One or more of the above polysiloxane are used for the above purpose.

The polysiloxane (3) can be prepared by subjecting a starting corresponding siloxane, e.g.

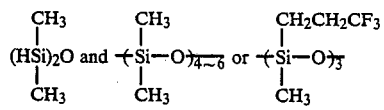

to equilibrium reaction in the presence of an acid catalyst such as sulfuric acid or $F_3SO_3H$.

It is preferred that the organopolysiloxane (3) has a viscosity at 25° C. of from 5 to 200 centistokes.

When the polysiloxane (3) is used, the content of fluorine atoms should be appropriately controlled similar to the case of the ingredient (2) so as to permit good miscibility of the ingredients (1), (2) and (3).

The amount is generally in the range of from 0 to 30 parts by weight, preferably from 1 to 10 parts by weight, per 100 parts by weight of the organopolysiloxane (1).

Furthermore, a platinum compound as the ingredient (4) is added as a catalyst. The platinum compound may be any known platinum catalysts used for hydrosilation and includes, for example, chloroplatinic acid, alcohol-modified chloroplatinic acid, olefin complexes of chloroplatinic acid, platinum black, or solid platinum supported on a carrier such as alumina, silica or the like. It is preferred that chloroplatinic acid or its olefin complexs are used after dissolution in alcohols, ketones, ethers or hydrocarbons. In order to increase the dispersibility, the solid catalyst should preferably be finely divided, or the carrier used should preferably have a small particle size and a great specific surface area.

The platinum catalyst (4) is used in a catalytic amount, which may be appropriately controlled depending upon a desired rate of vulcanization or curing. In this connection, however, in view of economy and for good vulcanization, those catalysts miscible with siloxane, e.g. chloroplatinic acid, are used in an amount of from 1 to 30 ppm as platinum, per the total amount of the ingredients (1), (2) and (3). With solid catalysts such as platinum black, the amount ranges from 20 to 50 ppm as platinum.

In addition to these ingredients (1) to (4), the composition of the invention may further comprise various additives ordinarily used in this art. For instance, an organopolysiloxane having a resin structure and consisting of $SiO_2$ units, $CH_2=CH(R_2^1)SiO_{0.5}$ units, $R_3^4Si-O_{0.5}$ units, $(R^5CH_2CH_2)CH_3SiO$ units or $(R^5CH_2CH_2)(CH_3)_2SiO_{0.5}$ units, in which $R^1$, $R^4$ and $R^5$ have, respectively, the same meanings as defined before, as disclosed in Japanese Patent Publication Nos. 38-26771 and 45-9476 may be added in order to increase the strength of the resultant vulcanized elastomer. Moreover, for the purpose of controlling the vulcanizing or curing rate of the composition, a cyclic siloxane of the formula,

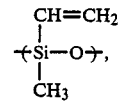

a polysiloxane containing the units of the formula, $$\begin{array}{c} CH=CH_2 \\ | \\ -(Si-O)- \\ | \\ CH_3 \end{array}$$

(Japanese Patent Publication No. 48-10947), and an acetylene compound (U.S. Pat. No. 3,445,420) may be added to the composition. In addition, a suitable amount of a functionality-free organopolysiloxane may be added so as to improve the thermal shock resistance and flexibility.

For the purposes of reduction of thermal shrinkage at the time of vulcanization, a lowering of a thermal expansion rate of a vulcanized elastomer, and improvements of thermal stability, weatherability, chemical resistances, inflammability or mechanical strength or a lowering of gas permeability, fillers including, for example, fumed silica, quartz powders, glass fibers, carbon, metal oxides such as cerium oxide, iron oxide, titanium oxide and the like, and metal carbonates such as calcium carbonate, magnesium carbonate, and the like may be added. If necessary, suitable pigments, dyes or antioxidants may be further added.

The composition of the invention may be applied after dissolution in suitable organic solvents such as, for example, toluene, xylene, halogenated solvents and the like, depending upon the purpose and use, at a desired concentration.

The composition of the invention which comprises the above ingredients (1) to (4) and optional ingredients may be vulcanized or cured by allowing it to stand at room temperature. In order to promote the vulcanization, it is preferred to heat and vulcanize the composition at a temperature of, for example, not lower than 100° C., preferably not lower than 120° C. The curing temperature of greater than 800° C. should be avoided. In this connection, a larger amount of a platinum catalyst results in vulcanization at a faster reaction rate. In an extrusion molding system of liquid rubber, it is preferred that vulcanization is effected at a temperature of from 150° to 200° C. within 60 seconds and the resultant molding is after-cured at 150° to 200° C. for several hours, if necessary.

The composition of the invention can be vulcanized within a short time to give a cured product having a stable hardness and good physical properties. As a result, the resultant fluorinated silicone elastomers include a wide variety of gel to rubber products having good physical properties and can be appropriately used in various fields.

Preparatory Example for the ingredient (2) used in the present invention is described.

PREPARATORY EXAMPLE

A mixed solution of 890 g of trimethoxyvinylsilane and 1.2 g of an alcohol solution of chloroplatinic acid (having a platinum content of 2% by weight) was heated to about 90° C., into which 730 g of trimethoxysilane was dropped in 3 hours while care was giveun to the generation of heat. After completion of the dropping, the mixture was immediately subjected to distillation to obtain 1460 g of 1,2-bis(trimethoxysilyl)ethane having a boiling point of 96° C./5 mmHg at a yield of 90%. This was confirmed through IR, $H^1NMR$ and elementary analysis.

Subsequently, a mixed solution of 86.4 g of water, 115 g of 35% hydrochloric acid, 603 g of tetramethyldisiloxane and 750 g of isopropyl ether was cooled down to 0° to 5° C., into which 270 g of the 1,2-bis(trimethoxysilyl)ethane was dropped. After completion of the dropping, the mixture was immediately distilled to obtain 320 g of a liquid having a boiling point of 110° C./3 mmHg at a yield of 60%. The thus obtaind liquid was subjected to IR, H¹NMR and elementary analysis, thereby confirming a siloxane having the following structural formula (I)

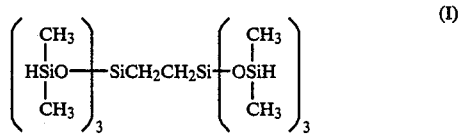

Thereafter, 80 g of the siloxane of the formula (I) and 140 g of 2,4,6-trimethyl-2,4,6-tris(3,3,3-trifluoropropyl)-cyclotrisiloxane were subjected to equilibrium reaction in the present of 0.2 g of a trifluoromethanesulfonic acid catalyst at 25° C. for 5 hours. Subsequently 1.0 g of sodium hydrogencarbonate was added to the resultant reaction mixture under agitation to neutralize the acid. After 2 hours, the reaction mixture was filtered to collect a copolymer having methyl-3,3,3-trifluoropropyl-siloxane units introduced substantially irregularly and dimethylhydrogensiloxy end groups. This copolymer had a viscosity of about 20 centistokes at 25° C. The content of SiH was found to be 0.0059 moles/g.

The present invention is more particularly described by way of examples, which should not be construed as limiting the invention. Comparative Examples are also described. In these examples and comparative examples, parts are by weight.

EXAMPLE 1 AND COMPARATIVE EXAMPLE 1

100 parts of copolymer (having a content of a vinyl group of 0.016 moles/100 g) which had a viscosity of 1000 centistokes at 25° C., whose end groups consisted of 50 mole% of vinyldimethylsiloxane units and 50 mole% of trimethylsiloxane units, and which had a molar ratio of dimethylsiloxane units and methyl-3,3,3-trifluoropropylsiloxane units of 3:7, 2.1 parts of the hydrogen copolymer obtained in the above Preparatory Example, and 0.05 parts of tetramethyltetravinylcy-clotetrasiloxane were uniformly mixed, to which 0.03 parts of an octanol-modified chloroplatinic acid catalyst having 2% by weight of platinum was added and uniformly mixed to obtain a vulcanizable fluorinated silicone composition A (Example 1).

For comparison, the above procedure was repeated except that there was used, instead of the hydrogen copolymer, 5 parts of copolymer whose end groups consisted of dimethylhydrogensiloxane units and which had a molar ratio of methyl-3,3,3-trifluoropropylsilox-ane units and methylhydrogensiloxane units of 7:2 with a viscosity of 180 centistokes and a content of SiH of 0.00234 moles/g, thereby obtaining a composition B (Comparative Example 1).

These silicone compositions A and B were each heated at 150° C. for 30 minutes. As a result, both compositions A and B were cured to give transparent gel products, respectively. These gel products were subjected to measurement of a penetration on the ¼ scale of ASTM to determine a hardness. The results are shown in Table 1.

TABLE 1

| Heating Temperature (150° C.) | | | | | |
|---|---|---|---|---|---|
| 30 min. | 60 min. | 2 hrs. | 4 hrs. | 24 hrs. | 48 hrs. |
| Gel From Composition A of Example 1: | | | | | |
| 65 | 64 | 64 | 64 | 64 | 64 |
| Gel From Composition B of Comparative Example 1: | | | | | |
| 75 | 73 | 70 | 67 | 65 | 63 |

As will be apparent from the above table, the time before the hardness of the gel from the composition B is stabilized is 4 hours or longer when the heating temperature is 150° C. However, the gel of the composition A ensures a stabilized hardness by heating at 150° C. for 30 minutes. Thus, the composition A of the invention was found to have a high vulcanizing rate.

EXAMPLE 2

To 100 parts of a linear polysiloxane of the following formula

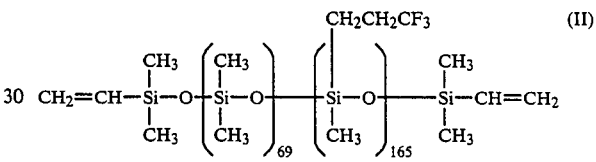

which had a vinyldimethylsilyl group at both ends thereof and contained a

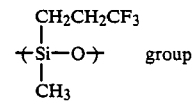 group with a viscosity of 5000 centistokes was added 30 parts of a dry finely divided silica powder surface treated with hexamethyldisilazane and a specific surface area of 180 m²/g, followed by kneading uniformly to obtain a mixture.

Thereafter, the mixture was divided into halves. 0.5 parts of tetramethyltetravinylcyclotetrasiloxane, 0.1 part of 2-ethylhexanol-modified chloroplatinic acid catalyst containing 2% by weight of platinum, and 0.5 parts of iron oxide (red oxide) as a coloring pigment were added to one of the halves, followed by kneading with a three-roll mill to obtain a composition C.

The other half was mixed 3 parts of a hydrogenpolysiloxane of the following formula (III)

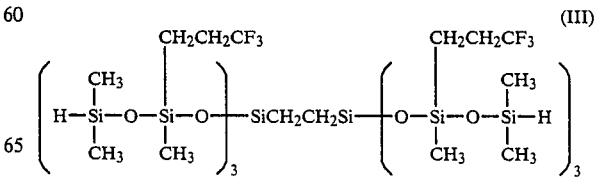

which contained a

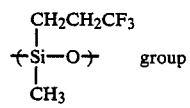

and had a hydrogenmethylsiloxane unit at both ends with a viscosity of 20 centistokes and 0.3 parts by cerium oxide used as a heat-resistant additive, followed by kneading with a three-roll mill to obtain a composition D.

Then, the above compositions C and D were mixed at C/D=1/1 and the vulcanization characteristics of the mixed composition was determined by the use of a Disk Rheometer ASTM 100 (available from Tokyo Seiki Co., Ltd.) under conditions of a temperature of 150° C., arc of ±3° and a sweeping time of 3 minutes. The vulcanization characteristics was determined as a time required for a 90% torque in case where a torque obtained 3 minutes after the sweeping time was assumed as a maximum value.

The mixed composition was charged into a liquid injection molding machine (Yamashiro Seiki Co., Ltd.) and molded into a sheet having size of 150×150×2 mm at an injection pressure of 90 kg/cm², an injection time of 5 seconds, and molding conditions of a temperature of 150° C. and 40 seconds. The sheet was post-cured at 150° C. for 1 hour. The thus cured sheet was subjected to measurement of physical properties according to the method prescribed in JIS-K-6301 and also variation in volume after immersion in regular gasoline, toluene, Skydrol Oil (LD-4, Monsant Co., Ltd.) at a temperature of 25° C. for 24 hours.

EXAMPLE 3

100 parts of a polysiloxane of the following formula (IV)

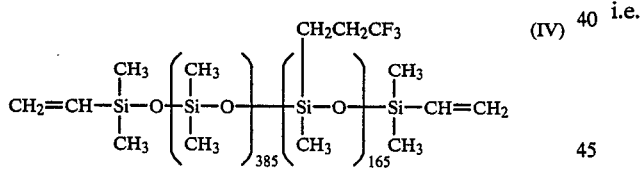

whose ends were blocked with a vinyldimethylsilyl group at contained a

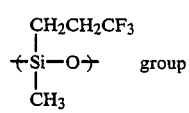

with a viscosity of 25,000 centistokes was mixed with 40 parts of wet process finely divided silica having a specific surface area of 115 m²/g and 2 parts of hexamethyldisilazane and kneaded in a kneader at 130° to 150° C. for 6 hours to obtain a uniform mixture.

Subsequently, the mixture was divided into halves. To one of the halves were added 1.0 part of tetramethyltetravinylcyclotetrasiloxane, 0.1 part of a 2-ethylhexanol-modified chloroplatinic acid and 0.5 parts of iron oxide were mixed together and kneaded with a three-roll mill to obtain a composition E.

The other half was mixed with 4 parts of a terminal hydrogen polysiloxane as used in Example 2 and 0.3 parts of cerium oxide and kneaded with a three-roll mill to obtain a composition F.

Thereafter, the compositions E and F were mixed at a ratio of 1:1 to obtain a mixed composition and subjected to various tests as in Example 2.

EXAMPLE 4

The general procedure of Example 3 was repeated except that in the composition F prepared in Example 3, 3 parts of the terminal hydrogen polysiloxane was used along with 1.5 parts of a terminal hydrogen polysiloxane of the following formula (V), thereby obtaining a composition G

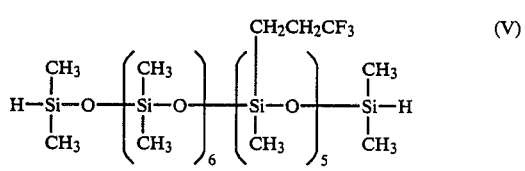

The composition G and the composition E obtained in Example 3 were mixed at a ratio of 1:1. The resultant composition was subjected to various tests as in Example 2.

COMPARATIVE EXAMPLE 2

The general procedure of Example 2 was repeated except that in the composition D of Example 2, there was used, instead of the terminal hydrogen polysiloxane, 10 parts of a side chain hydrogen polysiloxane of the following formula (VI) containing

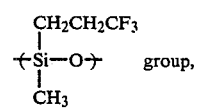

i.e.

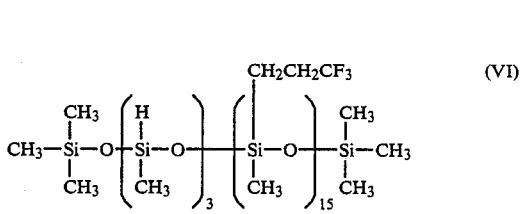

with a viscosity of 180 centistokes, thereby obtaining a composition H. This composition was mixed with the composition C at a ratio of 1:1. The resultant composition was subjected to various tests as in the foregoing examples.

COMPARATIVE EXAMPLE 3

The general procedure of Example 3 was repeated except that in the composition F of Example 3, there was used, instead of the terminal hydrogen polysiloxane, 10 parts of the side chain hydrogen polysiloxane used in Comparative Example 2, thereby obtaining a composition I. This composition was mixed with the compositions E at a ratio of 1:1. The resultant composition was subjected to various tests as in the foregoing examples.

COMPARATIVE EXAMPLE 4

To 100 parts of a linear polysiloxane of the following formula (VII)

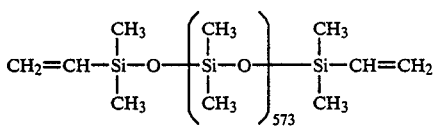
(VII)

which was blocked with a vinyldimethylsilyl group at both ends thereof and was free of a

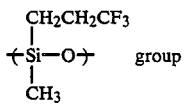
group with a viscosity of 10,000 centistokes was added 30 parts of silica as used in Example 2, followed by kneading in a kneader to obtain uniform mixture.

The mixture was divided into halves. One of the halves was mixed with 0.5 parts of tetramethyltetravinylcyclotetrasilane, 0.1 part of 2-ethylhexanol-modified chloroplastinic acid catalyst containing 2% by weight of platinum, and 0.5 parts of iron oxide (red oxide) used as a coloring pigment, followed by kneading with a three-roll mill to obtain a composition J.

The other half was mixed with 3 parts of a side chain hydrogen polysiloxane of the following formula (VII)

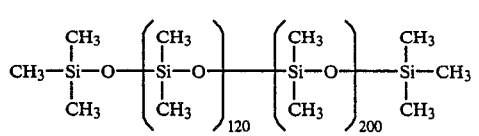
(VIII)

which was free of a

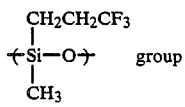
group with a viscosity of 100 centistokes, and 0.3 parts of cerium oxide, followed by kneading with a three-mill mill to obtain a composition K. The composition J and the composition K were mixed at a ratio of 1:1 and the resultant mixture was subjected to various tests as in the foregoing examples.

The test results are summarized in Table 2.

TABLE 2

| | Example | | | Comparative Example | | |
|---|---|---|---|---|---|---|
| | 2 | 3 | 4 | 2 | 3 | 4 |
| Time to 90% cure (seconds) | 45 | 55 | 60 | failure to cure but geled | failure to cure but geled | 40 |
| Physical properties of cured sheet | | | | | | |
| Specific Gravity (25° C.) | 1.34 | 1.28 | 1.28 | — | — | 1.10 |
| Hardness (JIS A) | 40 | 45 | 42 | failure to cure | failure to cure | 40 |
| Tensile Strength (kg/cm²) | 60 | 65 | 60 | — | — | 60 |
| Elongation (%) | 350 | 350 | 450 | — | — | 350 |
| Tear Strength (JIS A, kg/cm²) | 15 | 25 | 25 | — | — | 20 |
| Volume | | | | | | |

TABLE 2-continued

| | Example | | | Comparative Example | | |
|---|---|---|---|---|---|---|
| | 2 | 3 | 4 | 2 | 3 | 4 |
| Change: | | | | | | |
| Gasoline (%) | +50 | +150 | +170 | — | — | +300 |
| Toluene (%) | +40 | +100 | +130 | — | — | +200 |
| Skydrol (%) | +60 | +30 | +35 | — | — | +20 |

The results of Table 2 reveal that the compositions of the invention all exhibit good curability and well-balanced resistance to solvents. However, the compositions for comparison involve problems in balance of the curability and the solvent resistance.

What is claimed is:

1. A vulcanizable fluorinated silicone composition which comprises a uniform mixture of:
   (1) 100 parts by weight of an organopolysiloxane of the following average unit formula

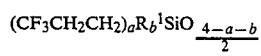

in which $R^1$ represents a monovalent hydrocarbon group having from 1 to 8 carbon atoms provided that at least 0.05 mole% of a vinyl group and/or an allyl group is contained in the organopolysiloxane, $a = 0.1$ to 1.0, $b = 2.5$ to 1.0, and $a+b = 1.8$ to 3.0;
   (2) from 0.1 to 30 parts by weight of an organohydrogenpolysiloxane having at least three SiH groups in one molecule and consisting of the following siloxane units

| | |
|---|---|
| $O_{\frac{3-c}{2}} - \overset{R_c^2}{\underset{\vert}{Si}} - Q - \overset{R_d^3}{\underset{\vert}{Si}} - O_{\frac{3-d}{2}}$ | 0.01–33 mole % |
| $H - \overset{CH_3}{\underset{\underset{CH_3}{\vert}}{Si}} - O_{0.5}$ | 0.02–85 mole % |
| $(R^5 - CH_2CH_2)\overset{CH_3}{\underset{\vert}{Si}}O$ | 0–96 mole % |
| $R_2^4SiO$ | 0–90 mole % | in which Q represents a divalent organic group having a molecular weight not larger than 200, $R^2$, $R^3$ and $R^4$ independently represent a monohydrocarbon group having from 1 to 8 carbon atoms, $R^5$ represents a perfluoroalkyl group having from 1 to 8 carbon atoms, $c = 0$ to 3, $d = 3$ to 0 and $c+d = 0$ to 3;
   (3) from 0 to 30 parts by weight of an organopolysiloxane of the following average formula

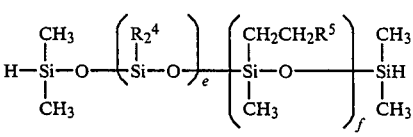

in which $R^4$ and $R^5$ have, respectively, the same meanings as defined above, $e = 0$ to 100, $f = 100$ to 0, and $e+f = 0$ to 100; and
   (4) a catalytic amount of a platinum compound.

2. The vulcanizable fluorinated silicone composition according to claim 1, wherein said organopolysiloxane (1) is in the form of a liquid having a viscosity of from 100 to 200,000 centistokes at 25° C.

3. The vulcanizable fluorinated silicone composition according to claim 1, wherein the

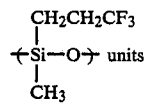

are contained at a concentration of not less than 30 mole%, in the organopolysiloxane (1).

4. The vulcanizable fluorinated silicone composition according to claim 1, wherein the amount of the organohydrogenpolysiloxane (2) is in the range of from 0.5 to 10 parts by weight.

5. The vulcanizable fluorinated silicone composition according to claim 1, wherein said organohydrogenpolysiloxane (2) is miscible with the organopolysiloxane (1).

6. The vulcanizable fluorinated silicone composition according to claim 1, wherein the organopolysiloxane (3) is contained in an amount of from 1 to 10 parts by weight.

7. The vulcanizable fluorinated silicone composition according to claim 1, wherein said platinum compound is miscible with the other ingredients (1) to (3) and is used in an amount of from 1 to 30 ppm as platinum based on the total amount of the ingredients (1) to (3).

8. The vulcanizable fluorinated silicone composition according to claim 1, wherein said platinum compound is in the form of solid and is used in an amount of from 20 to 500 ppm, as platinum, based on the total amount of the ingredients (1) to (3).

* * * * *